Patented Mar. 27, 1934

1,952,417

UNITED STATES PATENT OFFICE 1,952,417

PROCESS FOR CLEANING METAL MOLDS USED FOR THE VULCANIZATION OF RUBBER ARTICLES

William Howard Chandler, Shaker Heights, Ohio

No Drawing. Application March 23, 1932.
Serial No. 600,816

6 Claims. (Cl. 87—5)

This invention comprises a process for cleaning metal molds used for the vulcanization of rubber articles.

In the manufacture of rubber articles the compounded rubber is vulcanized by heat in molds usually made of metal such as cast iron, steel, aluminum or aluminum alloys; and some of the molds made of these base metals are occasionally electroplated with chromium, nickel, tin, etc. During the continuous use of these metal molds for such a process, the metal surfaces of the molds that come in contact with the rubber become coated over with a tightly adherent film or coating, which, when it accumulates sufficiently, causes the vulcanized article to stick to the mold and imposes difficulty in separating the article from the mold. The presence of this film or coating also impairs the finished appearance of the articles.

It is a common procedure in operating the vulcanization process to remove this film or coating from the surfaces of the mold by use of a flame, such as a blow torch, by scrubbing with a stiff wire brush, or by other laborious mechanical methods.

I have now invented a process to remove this film or coating from such molds by treating the coated surfaces for a short time with a solution of chromic acid, which dissolves or partially destroys this film or coating, and loosens the remainder so that it can be removed easily by flushing with water, plus occasionally the aid of a light brushing.

This process effects a considerable saving in the cost of cleaning these molds, by eliminating the laborious mechanical procedures heretofore employed.

In the successful operation of my process, I employ various concentrations of solutions of chromic acid in water, at various temperatures. In general, the higher the temperature, and the greater the concentration of the chromic acid in the solution, the more rapidly will the coating be removed. For this reason I do not wish to limit myself to specific concentrations of solutions, or to specific temperature ranges, except only the physical limitations imposed by the solubility of chromic acid in water, and the boiling point of the resultant solution at the pressure employed.

The process may be successfully operated in suitable containers under pressures higher than atmospheric, though for most purposes the operation of the process at atmospheric pressure in open tanks will be most advantageous.

To illustrate the operation of my process, the following examples are given. I use solutions of chromic acid of concentrations from about one pound per gallon to saturation, that is, from about 10% to 72% concentration, as weaker solutions require too long for economical action. A solution of from two to six pounds per gallon of solution, that is, from about 20% to 50% concentration, is also very effective. I also prefer to operate the process under atmospheric pressure near the boiling point of the solution used, which point is about 225° F. at atmospheric pressure. I have found that temperatures of from 150° F. to 200° F. are very satisfactory although lower temperatures may be used with a concurrent increase in the time of exposure of the mold to the bath. Higher pressures and temperatures can be used, however, when the process is carried on in suitable containers such as cast iron or steel autoclaves. As another specific example of my process I may employ a solution of chromic acid of concentration of about three pounds per gallon, that is, about 30%, near its boiling point under atmospheric pressure, and I apply this to the metal mold to be cleaned. It may be applied by immersing the mold in the solution for a period of from one quarter to one half hour depending upon the thickness and nature of the coating to be removed. When the mold is removed from this solution it is found to be entirely, or practically, free from the objectionable film or coating, and the remaining material, if any, will be loose, so that it can easily be removed by running water and a light brush.

I have tried the effect of the addition of other mineral acids and/or salts thereof, such as phosphoric acid, sulphuric acid, muriatic acid, sodium sulphate, sodium chloride, sodium fluoride, sodium phosphate and similar compounds, as oxidizing agents, to the chromic acid solution but have found them unnecessary for efficient operation. I prefer to use for my solution, chromic acid of reasonable commercial purity, but I do not object to the usual impurities found in commercial chromic acid. While I do not need, in the solution, any chemicals other than the chromic acid and water, there appear to be no objections to the presence in small quantities of the other elements recited.

It is obvious from the foregoing disclosure that the same results can be obtained by pouring the chromic acid solution onto the surface to be cleaned, or in any other way bringing said surface into contact with the chromic acid solution, so that my invention is not limited to the actual immersion of the mold into the chromic acid solution, altho that is usually the most convenient way to carry out the process.

This process is applicable to all the metals commonly used in making molds for the vulcanization of rubber, and is particularly valuable for molds made from cast iron, steel, aluminum and aluminum alloys, as well as for chromium plated surfaces on base metals.

Having fully described my invention and disclosed in detail the preferred conditions for its application, I now claim:—

1. A process for removing from the surface of metal molds used for thermal vulcanization of rubber articles the film or coating that forms on the said surface during the vulcanization process which consists of subjecting the coated surface to an aqueous solution containing chromic acid in an amount sufficient to disintegrate and remove the film, until the film has been substantially disintegrated, and thereafter rinsing the mold to remove the solution and any remaining film therefrom.

2. A process for removing from the surfaces of metal molds used for thermal vulcanization of rubber articles, the film or coating that forms on the said surfaces during the vulcanization process, which consists of subjecting the coating to an aqueous solution containing chromic acid in the concentration of from 10 to 72% at a temperature within the limits of 150° F. and 225° F. until the film has been substantially disintegrated, then removing the molds from contact with the solution, and rinsing and drying the molds.

3. The method of cleaning metal articles having a rubber containing film adhering thereto, which includes the steps of exposing such a film to a solution containing chromic acid with other chemicals in an amount sufficient to oxidize chemically the binding material of the film, thereafter rinsing the mold.

4. The method of removing a film of rubber containing material adhering to a mold in which rubber articles have been vulcanized, which comprises subjecting the film to a liquid containing chromic acid in an amount between about 10% and about 70% concentration for a sufficient time and a sufficient temperature for substantially complete oxidation of the binding material of the film to take place with disintegration of the film, and then removing the mold from the contact with the liquid and rinsing and drying the mold.

5. The method of removing a film of rubber containing matter adhering to a mold in which rubber articles have been vulcanized, which comprises subjecting the film to a liquid containing chromic acid amounting to between about 10% and about 70% concentration and at a temperature of between 70° F. and about 225° F. until the binding material of the film has been substantially disintegrated, and then removing the mold from contact with the liquid and rinsing the mold.

6. The method of removing film of rubber containing material adhering to a mold in which rubber articles have been vulcanized, which comprises subjecting the film to a liquid containing chromic acid to the extent of about 50% concentration at a temperature of about 210° F., until the film has substantially disintegrated, and then removing the mold from the liquid and rinsing the mold.

WILLIAM HOWARD CHANDLER.